US011799570B2

(12) United States Patent
Pezeshki et al.

(10) Patent No.: US 11,799,570 B2
(45) Date of Patent: Oct. 24, 2023

(54) TECHNIQUES FOR CROSS-BAND CHANNEL PREDICTION AND REPORTING

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/305,014

(22) Filed: Jun. 29, 2021

(65) Prior Publication Data
US 2021/0409133 A1    Dec. 30, 2021

Related U.S. Application Data

(60) Provisional application No. 63/046,310, filed on Jun. 30, 2020.

(51) Int. Cl.
*H04B 17/391* (2015.01)
*H04B 17/382* (2015.01)
*H04B 17/373* (2015.01)
*H04W 24/10* (2009.01)

(52) U.S. Cl.
CPC ....... *H04B 17/3913* (2015.01); *H04B 17/373* (2015.01); *H04B 17/382* (2015.01); *H04W 24/10* (2013.01)

(58) Field of Classification Search
CPC .......... H04B 17/3913; H04B 17/373; H04B 17/382; H04W 24/10
See application file for complete search history.

(56) References Cited

U.S. PATENT DOCUMENTS

| | | | |
|---|---|---|---|
| 2013/0215851 A1* | 8/2013 | Sato | H04L 5/0007 370/329 |
| 2021/0006989 A1* | 1/2021 | Lee | H04W 24/02 |

FOREIGN PATENT DOCUMENTS

CN      110034792 A      7/2019

OTHER PUBLICATIONS

International Search Report and Written Opinion—PCT/US2021/070804—ISA/EPO—dated Oct. 12, 2021.

* cited by examiner

Primary Examiner — Natasha W Cosme
(74) Attorney, Agent, or Firm — Dalei Dong; Harrity & Harrity, LLP

(57) ABSTRACT

Various aspects of the present disclosure generally relate to wireless communication. In some aspects, a user equipment may receive a reference signal in a first frequency band of a first frequency range; perform a measurement of the reference signal; determine a predicted measurement in a second frequency band of a second frequency range using a model and based at least in part on the measurement of the reference signal received in the first frequency band of the first frequency range; and transmit measurement information for the second frequency band based at least in part on the predicted measurement. Numerous other aspects are provided.

28 Claims, 9 Drawing Sheets

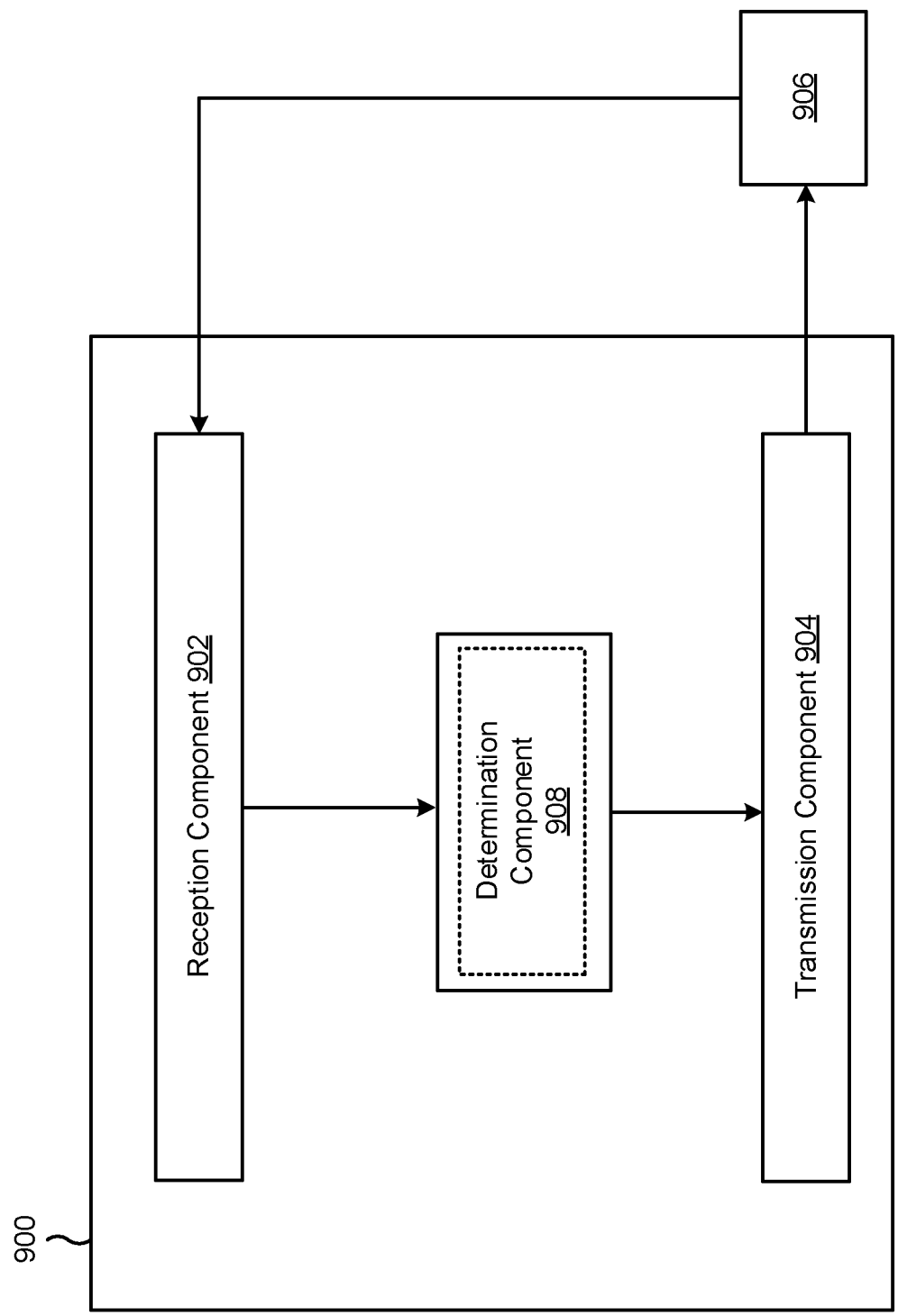

TECHNIQUES FOR CROSS-BAND CHANNEL PREDICTION AND REPORTING

CROSS-REFERENCE TO RELATED APPLICATION

This patent application claims priority to U.S. Provisional Patent Application No. 63/046,310, filed on Jun. 30, 2020, entitled "TECHNIQUES FOR CROSS-BAND CHANNEL PREDICTION AND REPORTING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for cross-band channel prediction and reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a reference signal in a first frequency band of a first frequency range. The method may include performing a measurement of the reference signal. The method may include determining a predicted measurement in a second frequency band of a second frequency range using a model and based at least in part on the measurement of the reference signal received in the first frequency band of the first frequency range. The method may include transmitting measurement information for the second frequency band based at least in part on the predicted measurement.

Some aspects described herein relate to a user equipment (UE) for wireless communication. The user equipment may include a memory and one or more processors coupled to the memory. The one or more processors may be configured to receive a reference signal in a first frequency band of a first frequency range. The one or more processors may be configured to perform a measurement of the reference signal. The one or more processors may be configured to determine a predicted measurement in a second frequency band of a second frequency range using a model and based at least in part on the measurement of the reference signal received in the first frequency band of the first frequency range. The one or more processors may be configured to transmit measurement information for the second frequency band based at least in part on the predicted measurement.

Some aspects described herein relate to a non-transitory computer-readable medium that stores one or more instructions for wireless communication by a user equipment (UE). The one or more instructions, when executed by one or more processors of the UE, may cause the UE to receive a reference signal in a first frequency band of a first frequency range. The one or more instructions, when executed by one or more processors of the UE, may cause the UE to perform a measurement of the reference signal. The one or more instructions, when executed by one or more processors of the UE, may cause the UE to determine a predicted measurement in a second frequency band of a second frequency range using a model and based at least in part on the measurement of the reference signal received in the first frequency band of the first frequency range. The one or more instructions, when executed by one or more processors of the UE, may cause the UE to transmit measurement information for the second frequency band based at least in part on the predicted measurement.

Some aspects described herein relate to an apparatus for wireless communication. The apparatus may include means for receiving a reference signal in a first frequency band of a first frequency range. The apparatus may include means for performing a measurement of the reference signal. The apparatus may include means for determining a predicted measurement in a second frequency band of a second frequency range using a model and based at least in part on the measurement of the reference signal received in the first frequency band of the first frequency range. The apparatus may include means for transmitting measurement information for the second frequency band based at least in part on the predicted measurement.

In some aspects, a method of wireless communication, performed by a UE, may include performing a measurement of a reference signal received in a first frequency range; determining a predicted measurement in a second frequency range using a model and based at least in part on the measurement of the reference signal received in the first frequency range; and transmitting measurement information for the second frequency range based at least in part on the predicted measurement.

In a first aspect, the method includes transmitting a request for the reference signal in the first frequency range; and receiving the reference signal in the first frequency range based at least in part on the request.

In a second aspect, alone or in combination with the first aspect, the model is a machine learning model that is trained based at least in part on a training set of measurements in the first frequency range and measurements in the second frequency range.

In a third aspect, alone or in combination with one or more of the first and second aspects, the model receives, as input, information identifying at least one of: the measurement, angle of arrival information of a channel associated with the reference signal, angle of departure information associated with the channel, an estimated power delay profile associated with the channel, or position information for the UE.

In a fourth aspect, alone or in combination with one or more of the first through third aspects, the model outputs information indicating one or more beam directions associated with the predicted measurement.

In a fifth aspect, alone or in combination with one or more of the first through fourth aspects, the method includes updating the model using a machine learning algorithm based at least in part on comparing the predicted measurement to an observed measurement in the second frequency range.

In a sixth aspect, alone or in combination with one or more of the first through fifth aspects, the method includes transmitting at least part of the measurement information on the uplink control channel in the second frequency range.

In a seventh aspect, alone or in combination with one or more of the first through sixth aspects, the measurement information on the uplink control channel in the second frequency range includes a flag indicating that the predicted measurement is based at least in part on a prediction.

In an eighth aspect, alone or in combination with one or more of the first through seventh aspects, the measurement information on the uplink control channel in the second frequency range includes a flag indicating that the predicted measurement is determined using the model.

In a ninth aspect, alone or in combination with one or more of the first through eighth aspects, the method includes transmitting the measurement information on the uplink control channel in the first frequency range.

In a tenth aspect, alone or in combination with one or more of the first through ninth aspects, the measurement information includes measurement information for the measurement on the reference signal received in the first frequency range and the predicted measurement in the second frequency range comprises a predicted channel measurement.

In an eleventh aspect, alone or in combination with one or more of the first through tenth aspects, the reference signal is a channel state information reference signal.

In a twelfth aspect, alone or in combination with one or more of the first through eleventh aspects, the measurement is performed in the first frequency range.

In a thirteenth aspect, alone or in combination with one or more of the first through twelfth aspects, the measurement information identifies the predicted measurement in the second frequency range.

In some aspects, a UE for wireless communication may include a memory and one or more processors coupled to the memory. The one or more processors may be configured to perform a measurement of a reference signal received in a first frequency range; determine a predicted measurement in a second frequency range using a model and based at least in part on the measurement of the reference signal received in the first frequency range; and transmit measurement information for the second frequency range based at least in part on the predicted measurement.

In a first aspect, the UE may transmit a request for the reference signal in the first frequency range; and receive the reference signal in the first frequency range based at least in part on the request.

In a second aspect, alone or in combination with the first aspect, the model is a machine learning model that is trained based at least in part on a training set of measurements in the first frequency range and measurements in the second frequency range.

In a third aspect, alone or in combination with one or more of the first and second aspects, the model receives, as input, information identifying at least one of: the measurement, angle of arrival information of a channel associated with the reference signal, angle of departure information associated with the channel, an estimated power delay profile associated with the channel, or position information for the UE.

In a fourth aspect, alone or in combination with one or more of the first through third aspects, the model outputs information indicating one or more beam directions associated with the predicted measurement.

In a fifth aspect, alone or in combination with one or more of the first through fourth aspects, the UE may update the model using a machine learning algorithm based at least in part on comparing the predicted measurement to an observed measurement in the second frequency range.

In a sixth aspect, alone or in combination with one or more of the first through fifth aspects, the UE may transmit at least part of the measurement information on the uplink control channel in the second frequency range.

In a seventh aspect, alone or in combination with one or more of the first through sixth aspects, the measurement information on the uplink control channel in the second frequency range includes a flag indicating that the predicted measurement is based at least in part on a prediction.

In an eighth aspect, alone or in combination with one or more of the first through seventh aspects, the measurement information on the uplink control channel in the second frequency range includes a flag indicating that the predicted measurement is determined using the model.

In a ninth aspect, alone or in combination with one or more of the first through eighth aspects, the UE may transmit the measurement information on the uplink control channel in the first frequency range.

In a tenth aspect, alone or in combination with one or more of the first through ninth aspects, the measurement information includes measurement information for the measurement on the reference signal received in the first frequency range and the predicted measurement in the second frequency range comprises a predicted channel measurement.

In an eleventh aspect, alone or in combination with one or more of the first through tenth aspects, the reference signal is a channel state information reference signal.

In a twelfth aspect, alone or in combination with one or more of the first through eleventh aspects, the measurement is performed in the first frequency range.

In a thirteenth aspect, alone or in combination with one or more of the first through twelfth aspects, the measurement information identifies the predicted measurement in the second frequency range.

In some aspects, a non-transitory computer-readable medium may store one or more instructions for wireless communication. The one or more instructions, when executed by one or more processors of a UE, may cause the one or more processors to perform a measurement of a reference signal received in a first frequency range; determine a predicted measurement in a second frequency range using a model and based at least in part on the measurement of the reference signal received in the first frequency range; and transmit measurement information for the second frequency range based at least in part on the predicted measurement.

In a first aspect, the one or more instructions, when executed by one or more processors of a UE, may cause the one or more processors to transmit a request for the reference signal in the first frequency range; and receive the reference signal in the first frequency range based at least in part on the request.

In a second aspect, alone or in combination with the first aspect, the model is a machine learning model that is trained based at least in part on a training set of measurements in the first frequency range and measurements in the second frequency range.

In a third aspect, alone or in combination with one or more of the first and second aspects, the model receives, as input, information identifying at least one of: the measurement, angle of arrival information of a channel associated with the reference signal, angle of departure information associated with the channel, an estimated power delay profile associated with the channel, or position information for the UE.

In a fourth aspect, alone or in combination with one or more of the first through third aspects, the model outputs information indicating one or more beam directions associated with the predicted measurement.

In a fifth aspect, alone or in combination with one or more of the first through fourth aspects, the one or more instructions, when executed by one or more processors of a UE, may cause the one or more processors to update the model using a machine learning algorithm based at least in part on comparing the predicted measurement to an observed measurement in the second frequency range.

In a sixth aspect, alone or in combination with one or more of the first through fifth aspects, the one or more instructions, when executed by one or more processors of a UE, may cause the one or more processors to transmit at least part of the measurement information on the uplink control channel in the second frequency range.

In a seventh aspect, alone or in combination with one or more of the first through sixth aspects, the measurement information on the uplink control channel in the second frequency range includes a flag indicating that the predicted measurement is based at least in part on a prediction.

In an eighth aspect, alone or in combination with one or more of the first through seventh aspects, the measurement information on the uplink control channel in the second frequency range includes a flag indicating that the predicted measurement is determined using the model.

In a ninth aspect, alone or in combination with one or more of the first through eighth aspects, the one or more instructions, when executed by one or more processors of a UE, may cause the one or more processors to transmit the measurement information on the uplink control channel in the first frequency range.

In a tenth aspect, alone or in combination with one or more of the first through ninth aspects, the measurement information includes measurement information for the measurement on the reference signal received in the first frequency range and the predicted measurement in the second frequency range comprises a predicted channel measurement.

In an eleventh aspect, alone or in combination with one or more of the first through tenth aspects, the reference signal is a channel state information reference signal.

In a twelfth aspect, alone or in combination with one or more of the first through eleventh aspects, the measurement is performed in the first frequency range.

In a thirteenth aspect, alone or in combination with one or more of the first through twelfth aspects, the measurement information identifies the predicted measurement in the second frequency range.

In some aspects, an apparatus for wireless communication may include means for performing a measurement of a reference signal received in a first frequency range; means for determining a predicted measurement in a second frequency range using a model and based at least in part on the measurement of the reference signal received in the first frequency range; and means for transmitting measurement information for the second frequency range based at least in part on the predicted measurement.

In a first aspect, the apparatus may include means for transmitting a request for the reference signal in the first frequency range; and receiving the reference signal in the first frequency range based at least in part on the request.

In a second aspect, alone or in combination with the first aspect, the model is a machine learning model that is trained based at least in part on a training set of measurements in the first frequency range and measurements in the second frequency range.

In a third aspect, alone or in combination with one or more of the first and second aspects, the model receives, as input, information identifying at least one of: the measurement, angle of arrival information of a channel associated with the reference signal, angle of departure information associated with the channel, an estimated power delay profile associated with the channel, or position information for the UE.

In a fourth aspect, alone or in combination with one or more of the first through third aspects, the model outputs information indicating one or more beam directions associated with the predicted measurement.

In a fifth aspect, alone or in combination with one or more of the first through fourth aspects, the apparatus may include means for updating the model using a machine learning algorithm based at least in part on comparing the predicted measurement to an observed measurement in the second frequency range.

In a sixth aspect, alone or in combination with one or more of the first through fifth aspects, the apparatus may include means for transmitting at least part of the measurement information on the uplink control channel in the second frequency range.

In a seventh aspect, alone or in combination with one or more of the first through sixth aspects, the measurement information on the uplink control channel in the second frequency range includes a flag indicating that the predicted measurement is based at least in part on a prediction.

In an eighth aspect, alone or in combination with one or more of the first through seventh aspects, the measurement information on the uplink control channel in the second frequency range includes a flag indicating that the predicted measurement is determined using the model.

In a ninth aspect, alone or in combination with one or more of the first through eighth aspects, the apparatus may include means for transmitting the measurement information on the uplink control channel in the first frequency range.

In a tenth aspect, alone or in combination with one or more of the first through ninth aspects, the measurement information includes measurement information for the measurement on the reference signal received in the first frequency range and the predicted measurement in the second frequency range comprises a predicted channel measurement.

In an eleventh aspect, alone or in combination with one or more of the first through tenth aspects, the reference signal is a channel state information reference signal.

In a twelfth aspect, alone or in combination with one or more of the first through eleventh aspects, the measurement is performed in the first frequency range.

In a thirteenth aspect, alone or in combination with one or more of the first through twelfth aspects, the measurement information identifies the predicted measurement in the second frequency range.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a block diagram of an example apparatus for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
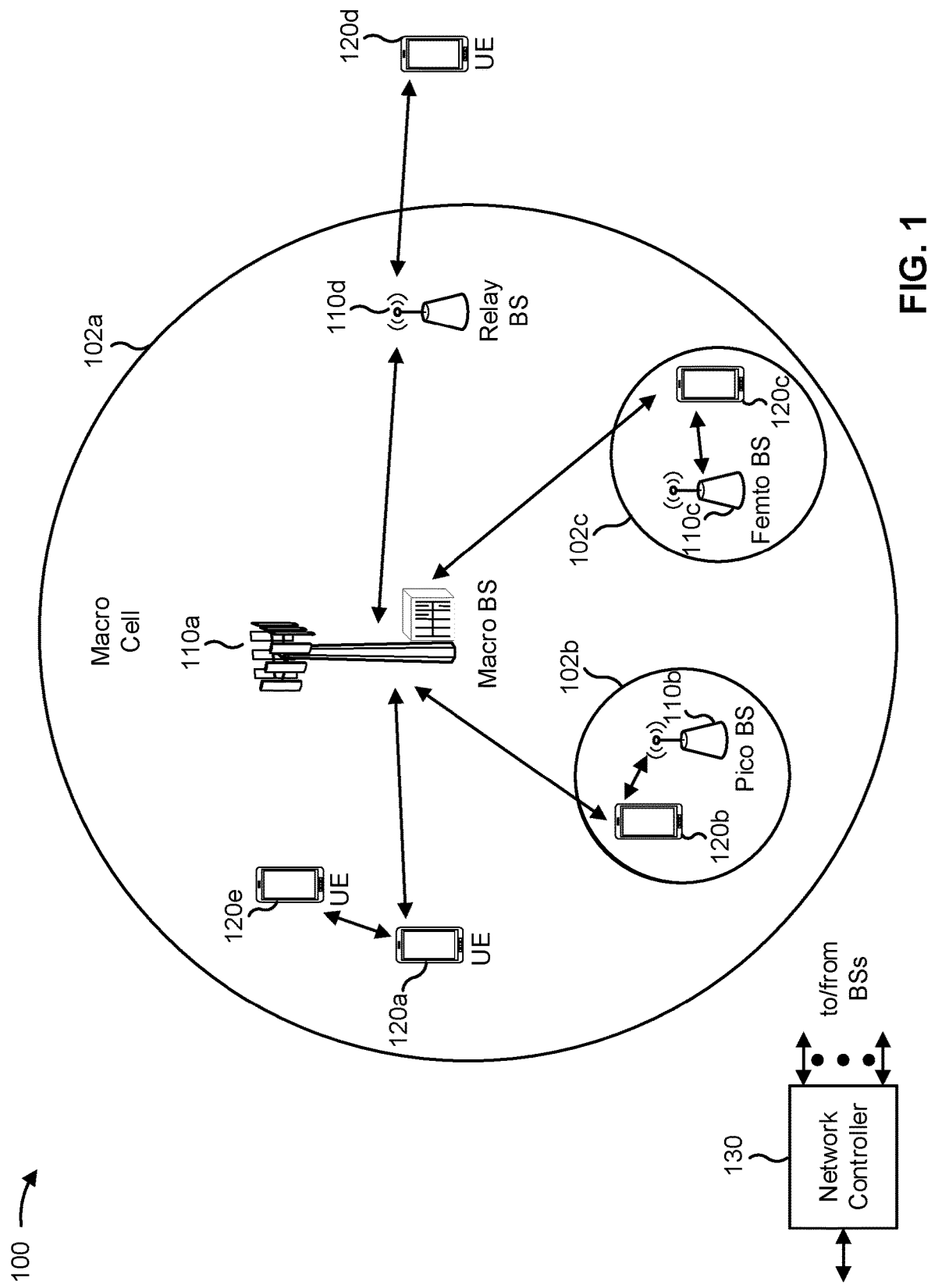
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
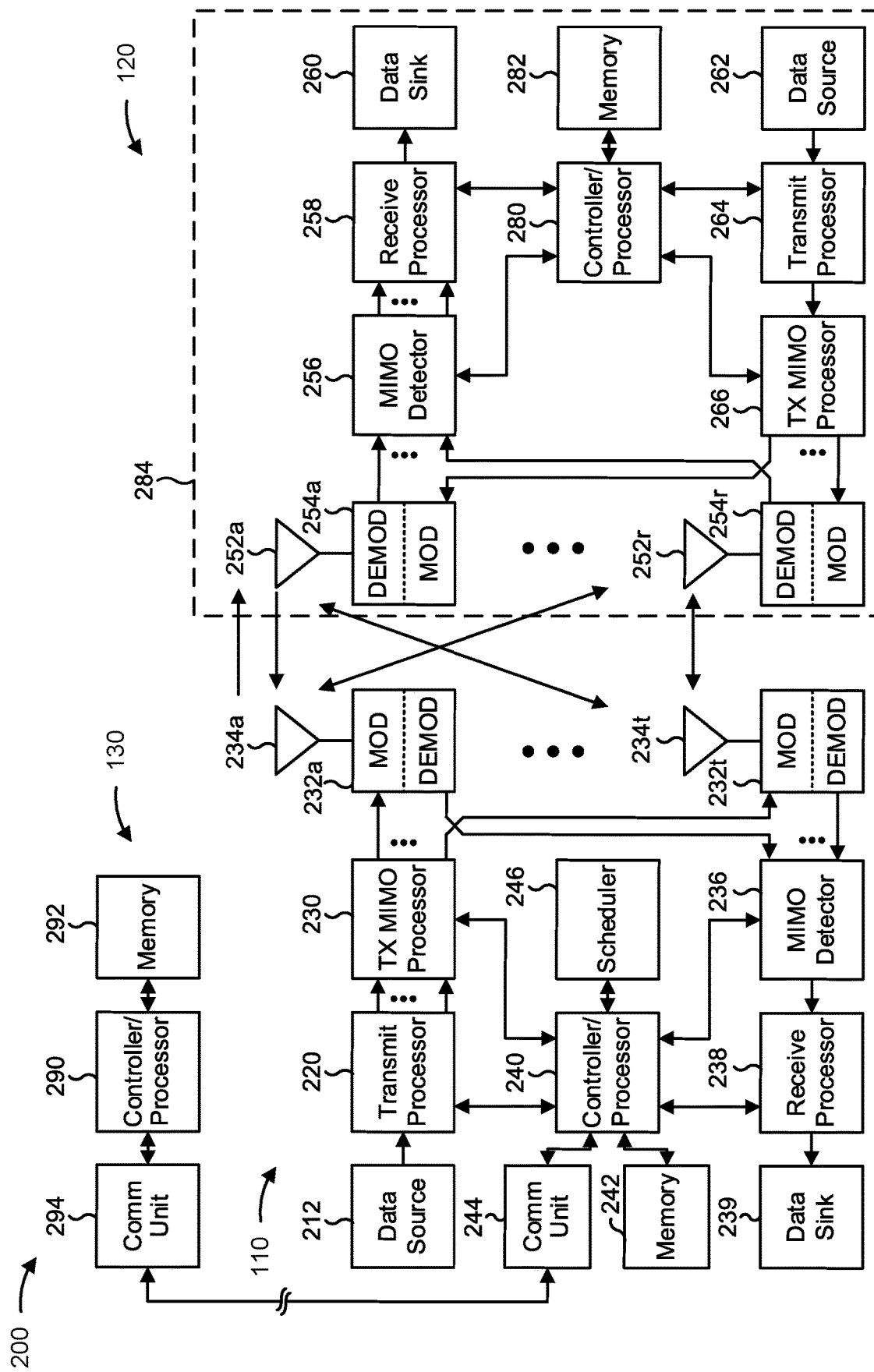
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with cross-band channel prediction and reporting, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions.

In some aspects, UE 120 may include means for performing a measurement of a reference signal received in a first frequency range; means for determining a predicted measurement in a second frequency range using a model and based at least in part on the measurement of the reference signal received in the first frequency range; and means for transmitting measurement information for the second frequency range based at least in part on the predicted measurement. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
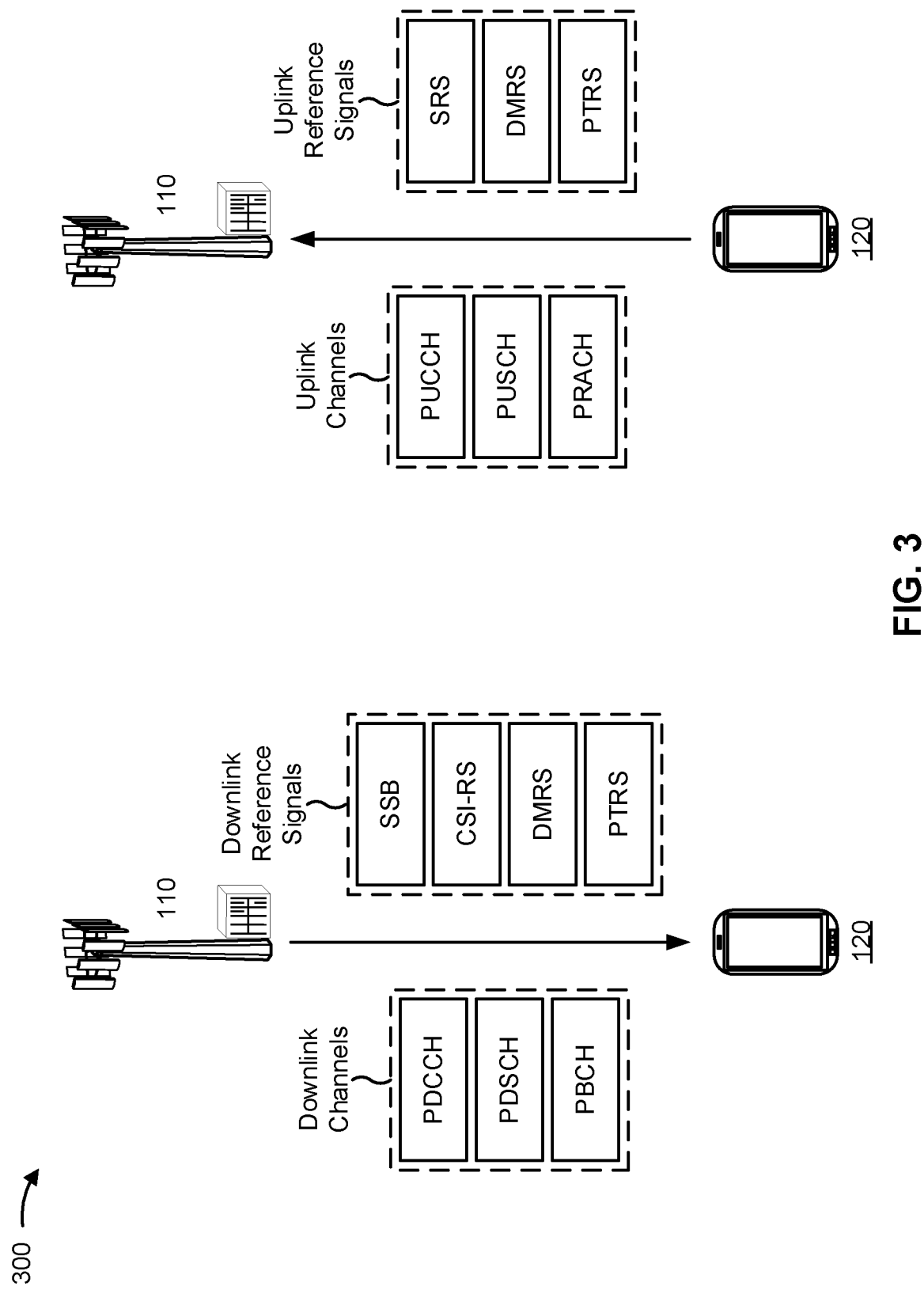
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

A UE may perform various types of measurements in the course of operation. For example, measurements may be used for channel estimation, beam selection, beam failure determination, cell selection and reselection, initial access, and so on. A measurement by a UE may involve the activation of a receive chain of the UE, processing of a received signal (e.g., a reference signal), and determination of a measurement based at least in part on the processing. For some measurements, such as beam selection, the UE may perform the measurement using one or more receive beams formed by the UE. In some aspects, the UE may request a reference signal for a measurement. In other aspects, the UE may perform a measurement on a signal that is not requested (e.g., a broadcasted signal, a signal configured by a base station and transmitted to the UE, and/or the like).

Some UEs can operate in multiple different bands across two or more frequency ranges. Examples of frequency ranges include the sub-6 GHz band and the mmWave band, as described elsewhere herein. Operation in a higher frequency range may involve more resource consumption than operation in a lower frequency range, due to higher operating wavelengths, larger data throughput necessitating faster baseband processing, more complex beamforming, increased power consumption for analog to digital converters operating at large bandwidths, and so on. If a UE uses multiple frequency ranges to communicate (such as the sub-6 GHz band and the mmWave band, though other combinations of bands or frequency ranges can be used), then measurement of reference signals in a higher frequency range may consume significantly more resources of the UE than measurement of reference signals in a lower frequency range. Also, some UEs may have hardware configurations that are capable of measurement of reference signals in a lower frequency range and not measurement of reference signals in a higher frequency range, or the hardware configuration of the UE may lead to less efficient measurement in the higher frequency range than the lower frequency range. Thus, performing measurements in two or more frequency ranges may consume more battery power, communication resources, and computing resources than performing measurements in a single frequency range.

Some techniques and apparatuses described herein enable determination of a predicted measurement in a second frequency range based at least in part on a measurement in a first frequency range. For example, a UE may determine a measurement on a reference signal in a first frequency range (e.g., FR1, FR2, and/or the like), and the UE may determine a predicted measurement for a theoretical reference signal in a second frequency range (e.g., FR2, Frequency Range 4 (FR4), and/or the like). In some aspects, the UE may determine the predicted measurement using a model. For example, the model may be trained and/or updated using a machine learning algorithm, as described in more detail elsewhere herein. By determining the predicted measurement in the second frequency range, the UE may conserve battery power, communication resources, and processing resources that would otherwise be used to perform a measurement in the second frequency range. Furthermore, lower-capability UEs, which may not be capable of efficient measurement (or any measurement) in the second frequency range, may determine a predicted measurement for the second frequency range, which may be useful for operations of the lower-capability UEs and/or for other devices (e.g., other base stations, other UEs, and/or the like).

The techniques and apparatuses described herein are generally described as being performed with regard to a reference signal in a lower frequency range and a predicted measurement in a higher frequency range. However, the techniques and apparatuses described herein can be performed with regard to any pair of frequency ranges. In some aspects, a reference signal in a higher frequency range may be used to determine a predicted measurement in a lower frequency range, in accordance with various aspects described herein.

Figure 4:
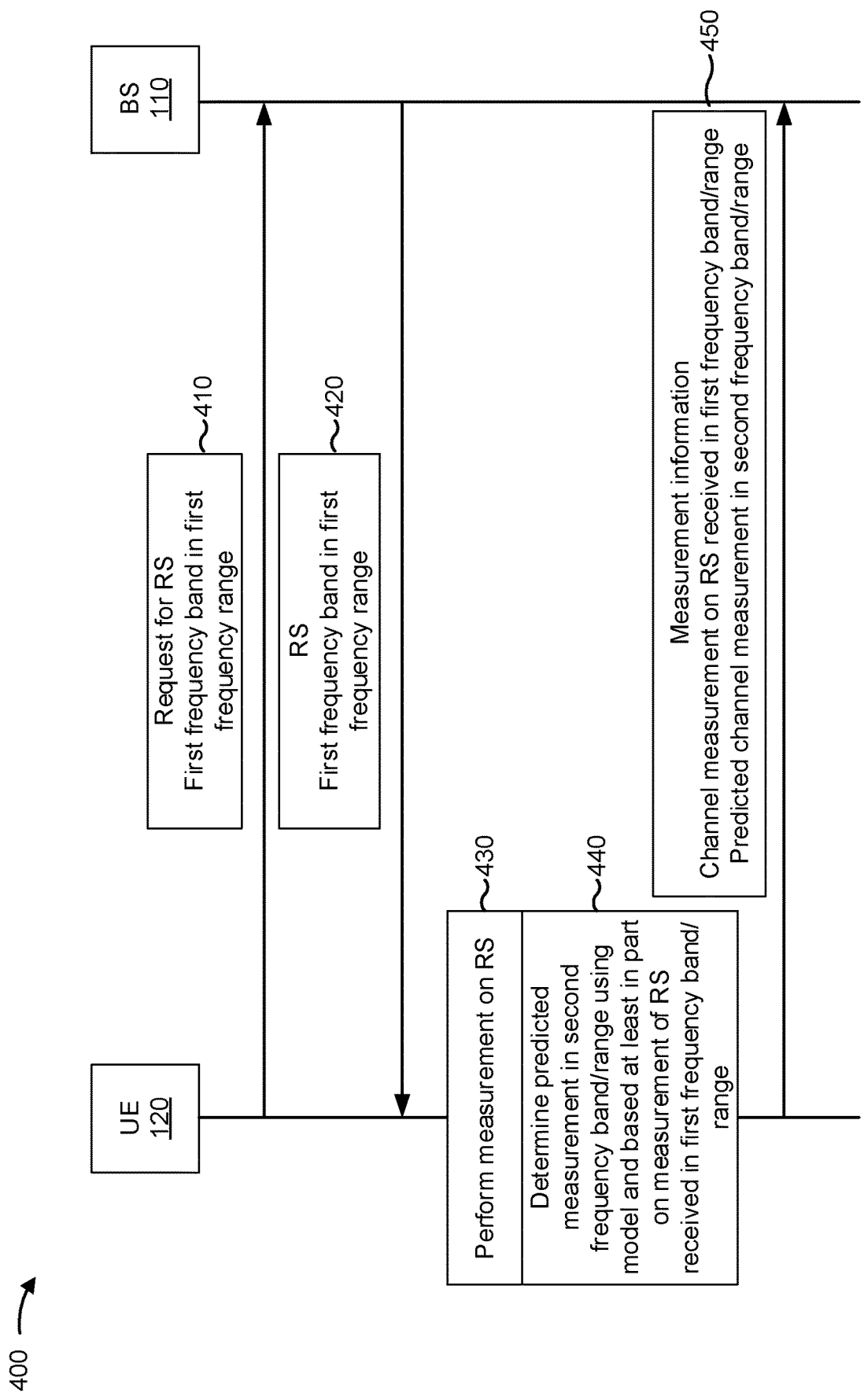
FIG. 4 is a diagram illustrating an example of prediction of a measurement in a second frequency range based at least in part on a measurement in a first frequency range, in accordance with the present disclosure.

FIG. 4 is a diagram illustrating an example 400 of prediction of a measurement in a second frequency range based at least in part on a measurement in a first frequency range, in accordance with the present disclosure. As shown, example 400 includes a UE 120 and a BS 110.

As shown by reference number 410, the UE 120 may transmit, and the BS 110 may receive, a request for a reference signal (RS) in a first frequency range. The RS may include a CSI-RS or another RS. For example, the UE 120 may transmit a request for a CSI-RS and/or the like. The UE 120 may request the RS in a first frequency range, such as FR1, FR2, and/or the like. For example, the UE 120 may request that the BS 110 transmit the RS in the first frequency range. In some aspects, the UE 120 may request the RS in a first frequency band. As used herein, "frequency band" may refer to a bandwidth part, a resource pool, an operating bandwidth of the UE 120, a carrier, a part of a frequency range, an entire frequency range, or the like.

In some aspects, the BS 110 may allocate resources based at least in part on the request for the RS in the first reference signal. For example, the BS 110 may configure a measurement resource, or allocate a downlink resource for the RS and/or an uplink resource for reporting information regarding the RS. In some aspects, the BS 110 may allocate an uplink resource only in the first frequency range (e.g., on a primary cell (PCell) or a primary secondary cell (PSCell) in the first frequency range), such as in the first frequency band of the first frequency range. In some aspects, the BS 110 may allocate an uplink resource in the first frequency range (e.g., on a PCell or a PSCell), such as in the first frequency band of the first frequency range and the second frequency range (e.g., on a secondary cell (SCell) such as a physical uplink control channel (PUCCH) SCell) such as in a second frequency band of the second frequency range.

In some aspects, the UE 120 may not transmit a request for the RS in the first range. For example, the UE 120 may use an RS that is already configured (e.g., prior to the operations of example 400) to determine a predicted measurement in a second frequency range. In some aspects, the UE 120 may provide a flag (e.g., a value, an indication, and/or the like) indicating that reported measurement (e.g., measurement information) for the second frequency range is based at least in part on a prediction or a model (e.g., as opposed to actual RS measurements performed in the second frequency range). In some other aspects, the UE 120 may provide the reported measurement for the second frequency range on a resource configured for reporting predicted measurements.

As shown by reference number 420, the BS 110 may transmit, and the UE 120 may receive, the RS. For example, the BS 110 may transmit the RS based at least in part on the request. For example, the UE 120 may receive the RS in the first frequency range, such as in a first frequency band of the first frequency range. As shown by reference number 430, the UE 120 may perform a measurement on the RS received in the first frequency range. For example, the UE 120 may determine a measurement value (e.g., a reference signal received power (RSRP), a signal to interference plus noise ratio (SINR), and/or the like) based at least in part on the RS received in the first frequency range. In some aspects, the UE 120 may determine information associated with the RS received in the first frequency range, such as an angle of arrival (AOA), an angle of departure (AOD), location information associated with the UE 120, a channel power delay profile (PDP) (also referred to herein as a PDP channel estimation value) for the first frequency range, and/or the like. At least part of the determined information may be used by the model to determine a predicted measurement for the second frequency range.

In some aspects, the BS 110 may configure the UE 120 with a set of RSs. For example, the BS 110 may provide a measurement configuration for the set of RSs. The measurement configuration may indicate a set of resources, in the first frequency range, for the set of RSs. The set of resources may be configured in a first frequency band of the first frequency range. In some aspects, the measurement configuration may indicate a set of resources, in the second frequency range, for which the UE 120 is to report a predicted measurement. For example, the measurement configuration may configure an RS resource in the second frequency range. As another example, the measurement configuration may indicate a second frequency band.

As shown by reference number 440, the UE 120 may determine a predicted measurement in a second frequency range (such as a second frequency band in the second frequency range) based at least in part on the measurement on the RS received in the first frequency range (such as a first frequency band in the first frequency range). For example, the UE 120 may determine a value of the predicted measurement in a second frequency range different than the first frequency range. The UE 120 may determine the predicted measurement using a model. The model may receive, as input, a measurement value associated with the measurement on the RS received in the first frequency band or range. The model may output information indicating a predicted measurement in the second frequency band or range. The model may be trained and/or updated based at least in part on a machine learning process, as described in connection with FIG. 5. For example, the model may be trained and/or updated by the UE 120, or may be trained and/or updated by another device and used by the UE 120. The first frequency range and the second frequency range may include any pair of frequency ranges, such as a pair of frequency ranges selected from FR1, FR2, FR3, and FR4 of 5G/NR. In some aspects, the predicted measurement may include a channel measurement. In some aspects, the predicted measurement may include another type of measurement other than a channel measurement.

In some aspects, the UE 120 may determine the predicted measurement without having received an RS in the second frequency range. For example, the BS 110 may not transmit an RS in the second frequency range, which conserves resources of the BS 110 that would otherwise be used to allocate resources for and transmit the RS in the second frequency range. In some aspects, the BS 110 may transmit the RS in the second frequency range, and the UE 120 may not receive or decode the RS in the second frequency range (instead using the predicted measurement for the RS in the second frequency range), which conserves resources of the UE 120 that would otherwise be used to receive and decode the RS in the second frequency range. In some aspects, the UE 120 may receive the RS in the second frequency range and may compare an observed measurement determined based at least in part on the RS in the second frequency range and the predicted measurement. In some aspects, the UE 120 may update or train the model accordingly.

As shown by reference number 450, the UE 120 may transmit measurement information to the BS 110. For example, the UE 120 may transmit, on a PUCCH, a measurement report including information identifying the channel measurement performed in the first frequency range (such as the first frequency band of the first frequency range) and/or the predicted channel measurement in the second frequency range (such as the second frequency band of the second frequency range). In some aspects, if resources for PUCCHs are configured in the first frequency range and in the second frequency range, the UE 120 may report the predicted measurement on the resource for the PUCCH in the second frequency range (e.g., as if an RS was transmitted and received in the second frequency range). In some aspects, if a resource for a PUCCH is configured only in the first frequency range, then the UE 120 may transmit, in the first frequency range, a measurement report identifying the measurement performed in the, first frequency range and the predicted measurement in the second frequency range. In this case, the UE 120 may include a value (e.g., a flag and/or the like) indicated that the predicted measurement is a predicted measurement (e.g., as opposed to an actual measurement or an observed measurement). Thus, the UE 120 may determine and report, to the BS 110, a predicted measurement in a second frequency range based at least in part on performing a measurement on an RS that is transmitted in a first frequency range. Determining the predicted measurement may conserve resources of the UE 120 that would otherwise be used to perform a measurement in the second frequency range, and may enable UEs 120 that are incapable of performing or efficiently performing measurement in the second frequency range to transmit predicted measurement information for the second frequency range.

As indicated above, FIG. 4 is provided as an example. Other examples may differ from what is described with regard to FIG. 4.

Figure 5:
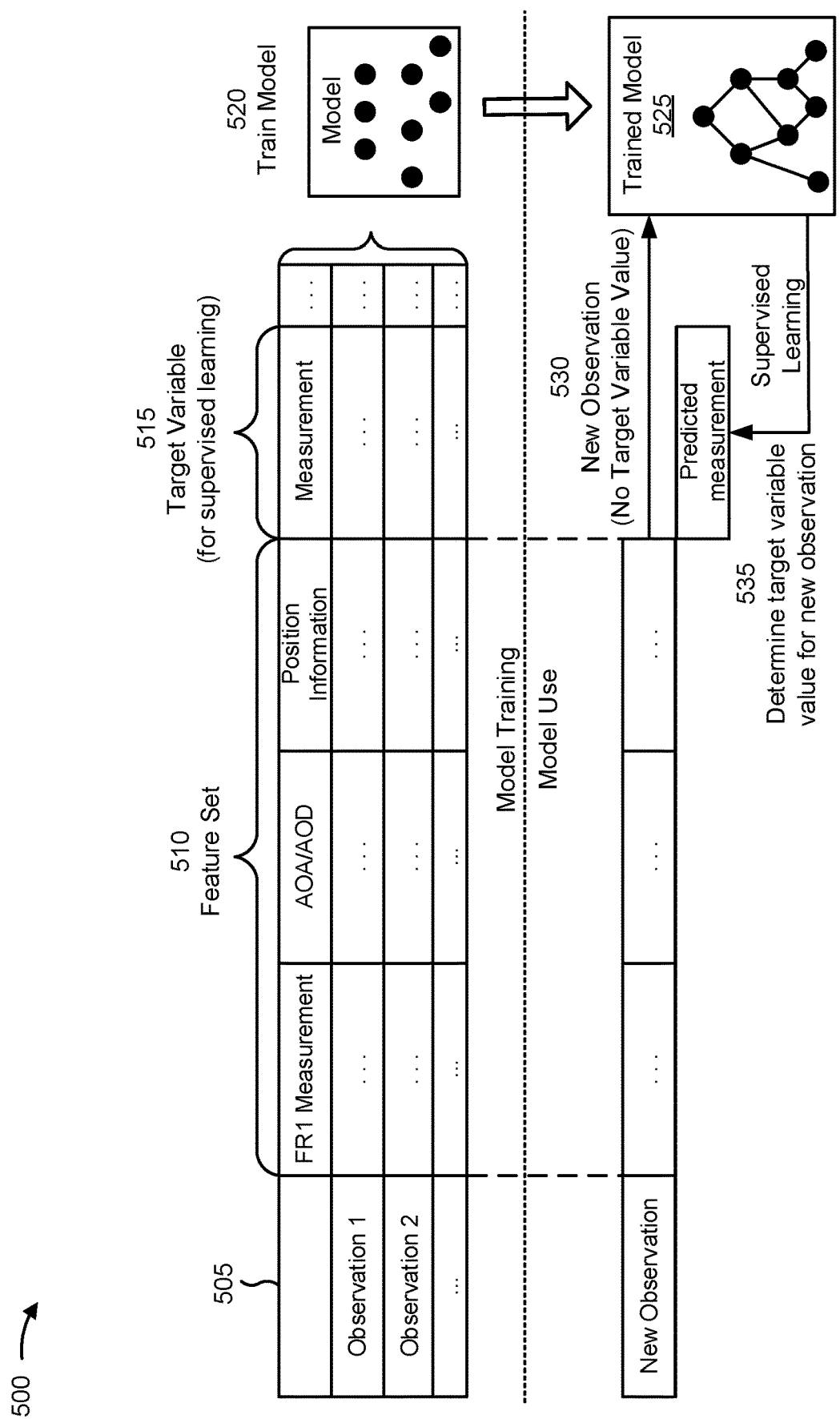
FIG. 5 is a diagram illustrating an example of training and using a machine learning model in connection with prediction of a measurement in a second frequency range based at least in part on a measurement in a first frequency range, in accordance with the present disclosure.

FIG. 5 is a diagram illustrating an example 500 of training and using a machine learning model in connection with prediction of a measurement in a second frequency range based at least in part on a measurement in a first frequency range, in accordance with the present disclosure. The machine learning model training and usage described herein may be performed using a machine learning system. The machine learning system may include or may be included in a computing device, a server, a cloud computing environment, a UE, a base station (e.g., a gNB), a 5G core network device, and/or the like, such as the UE 120 or the BS 110 described in more detail elsewhere herein. In some aspects, the training and/or updating of the machine learning model may be performed by a different device than the usage of the machine learning model.

As shown by reference number 505, a machine learning model may be trained using a set of observations. The set of observations may be obtained from historical data, such as data gathered during one or more processes described herein. In some implementations, the machine learning system may receive the set of observations (e.g., as input) from a UE 120, as described elsewhere herein.

As shown by reference number 510, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based at least in part on input received from the UE 120. For example, the machine learning system may identify a feature set (e.g., one or more features and/or feature values) by extracting the feature set from structured data, by extracting the feature set from unstructured data, by receiving input from an operator, and/or the like.

As an example, a feature set for a set of observations may include a first feature of a measurement in a first frequency range, a second feature of angle of arrival (AOA) information or angle of departure (AOD) information, a third feature of position information associated with the UE 120, and so on. In some aspects, the feature set may include other features, such as power delay profile (PDP) channel estimation value for the first frequency range, a first frequency band on which an RS is received, a second frequency band for which a predicted measurement is to be determined and reported, and/or the like.

As shown by reference number 515, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 500, the target variable is a measurement value in a second frequency range. The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

As shown by reference number 520, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store or provide the machine learning model as a trained machine learning model 525 to be used to analyze new observations.

As shown by reference number 530, the machine learning system may apply the trained machine learning model 525 to a new observation, such as by receiving a new observation and inputting the new observation to the trained machine learning model 525. As shown, the new observation may include a first feature of a measurement in a first frequency range, a second feature of AOD information and/or AOA information, a third feature of location information associated with the UE 120, and so on, as an example. The machine learning system may apply the trained machine learning model 525 to the new observation to generate an output (e.g., a result). The type of output may depend on the type of machine learning model and/or the type of machine learning task being performed. For example, the output may include a predicted value of a target variable, such as when supervised learning is employed. As an example, the trained machine learning model 525 may predict a value for the target variable of the predicted measurement in the second frequency range for the new observation, as shown by reference number 535.

In some aspects, the output may include information that identifies a cluster to which the new observation belongs, information that indicates a degree of similarity between the new observation and one or more other observations, and/or the like, such as when unsupervised learning is employed.

In some implementations, reporting of the predicted measurement associated with the new observation may be based at least in part on a target variable value having a particular label (e.g., classification, categorization, and/or the like), may be based at least in part on whether a target variable value satisfies one or more thresholds (e.g., whether the target variable value is greater than a threshold, is less than a threshold, is equal to a threshold, falls within a range of threshold values, and/or the like), may be based at least in part on a cluster in which the new observation is classified, and/or the like.

In this way, the machine learning system may apply a rigorous and automated process to determination of a predicted measurement in a second frequency range based at least in part on a measurement in a first frequency range.

As indicated above, FIG. 5 is provided as an example. Other examples may differ from what is described in connection with FIG. 5.

Figure 6:
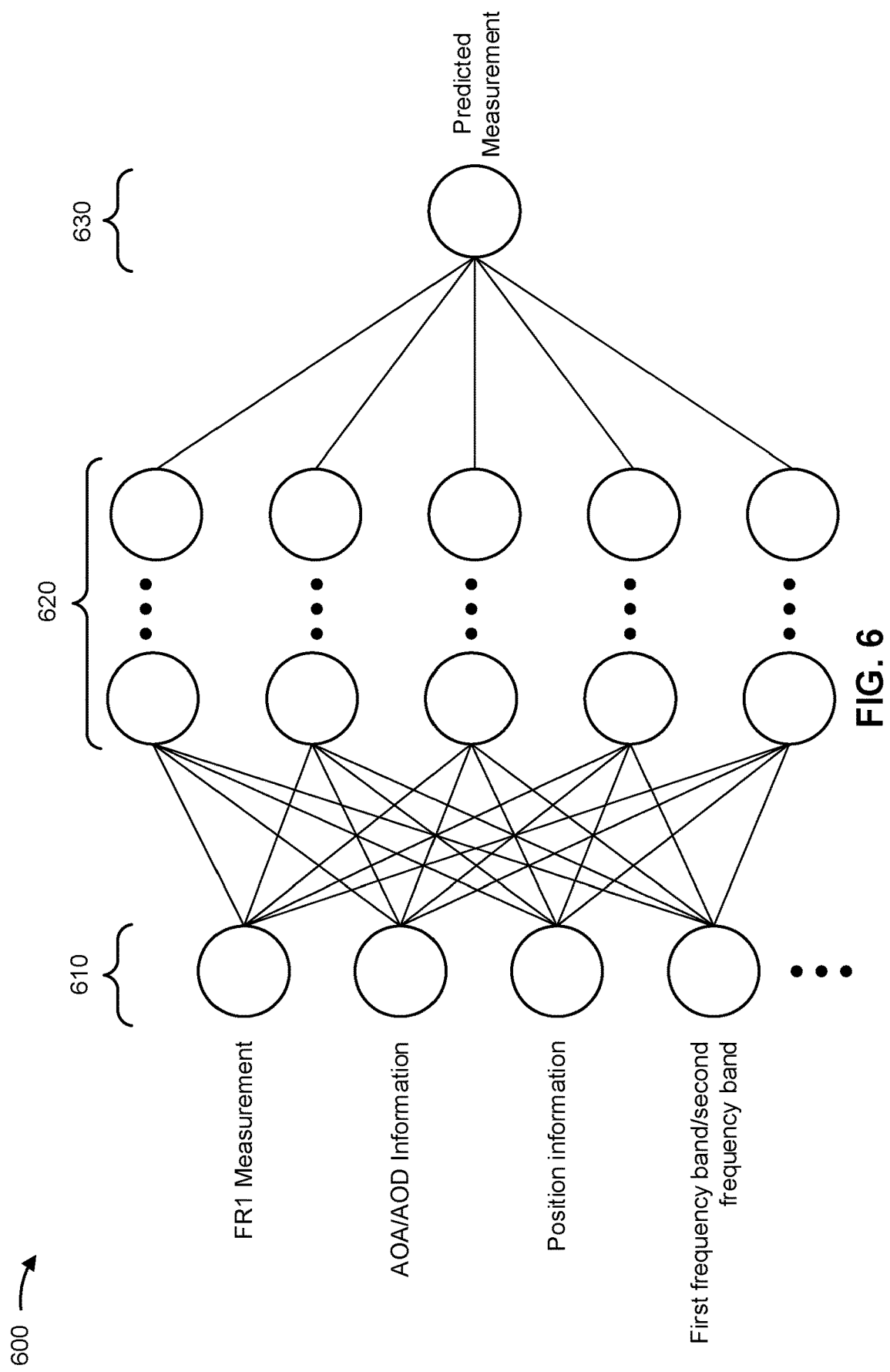
FIG. 6 is a diagram of an example implementation of a neural network that may be used to determine a predicted measurement, in accordance with the present disclosure.

FIG. 6 is a diagram of an example implementation of a neural network 600 that may be used to determine a predicted measurement in accordance with the present disclosure. Neural network 600 of FIG. 6 may comprise or be a part of the model described elsewhere herein. As shown, neural network 600 has an input layer 610, one or more intermediate layers 620 (referred to herein individually as "intermediate layer 620" and collectively as "intermediate layers 620"), and an output layer 630. As described herein, example neural network 600 may receive values for a set of parameters as inputs to input layer 610, use intermediate layers 620 to process the values for the set of parameters and determine a predicted measurement, and provide the predicted measurement via output layer 630 of neural network 600.

In the example of FIG. 6, input layer 610 receives a measurement in a first frequency range, AOA/AOD information, position information associated with the UE 120, a first frequency band of a first frequency range (in which an RS is received), and a second frequency band of a second frequency range (in which an RS resource for the predicted measurement is located), as inputs to neural network 600. In some aspects, input layer 610 receives an estimated channel PDP for the first frequency range. Neural network 600 may use the intermediate layers (e.g., hidden layers) to determine the predicted measurement based on the set of parameters. For example, the intermediate layers may include one or more feedforward layers and/or one or more recurrent layers to determine the predicted measurement. The one or more feedforward layers and/or recurrent layers may include a plurality of coupled nodes (also referred to as neurons) that are linked according to being trained as described herein. In this way, links between nodes of intermediate layers 620 may correspond to predictions, classifications, and/or the like that are associated with the parameters in order to determine a predicted measurement.

As indicated above, FIG. 6 is provided as an example. Other examples may differ from what is described in connection with FIG. 6.

Figure 7:
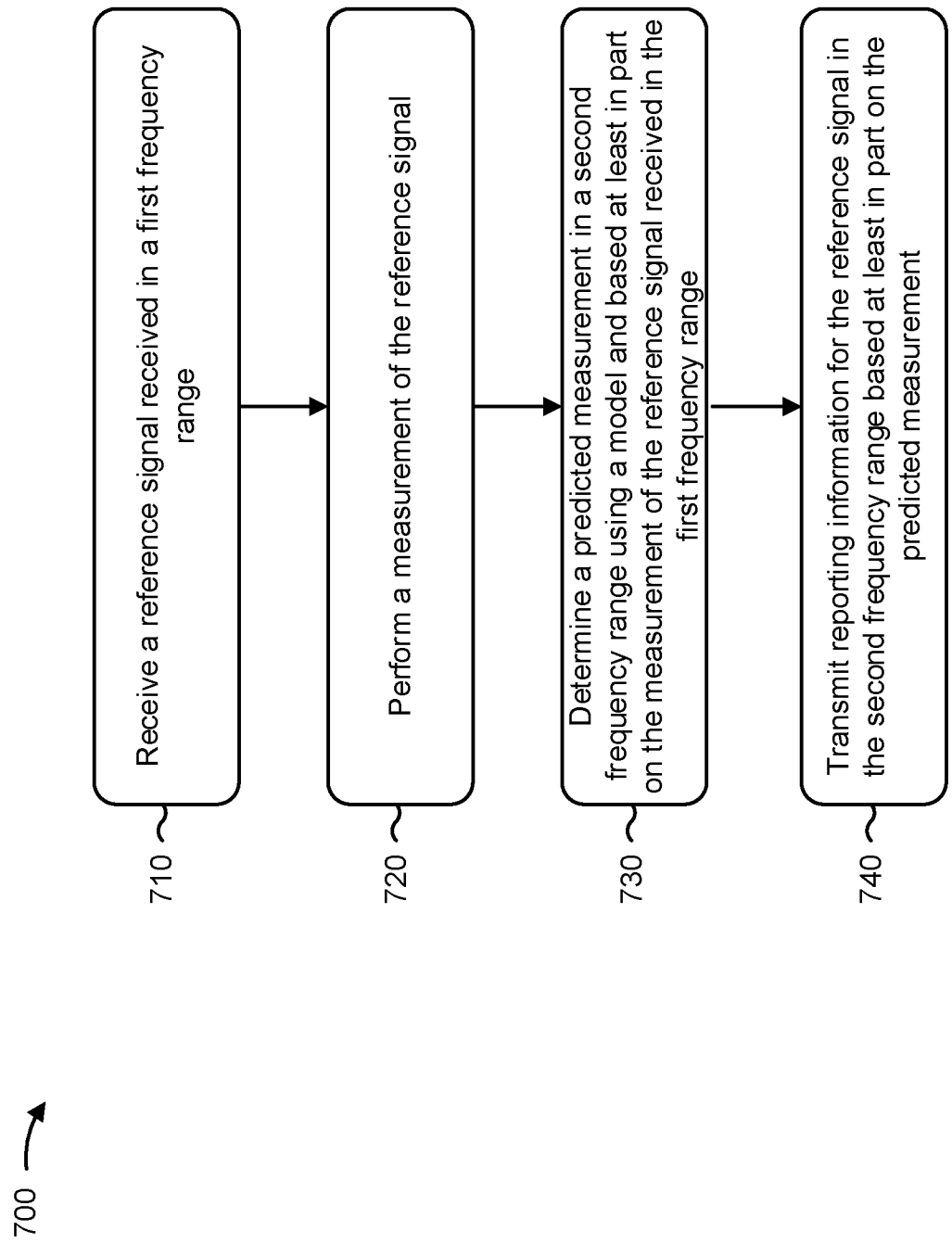
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with cross-band channel prediction and reporting.

As shown in FIG. 7, in some aspects, process 700 may include receiving a reference signal in a first frequency range (block 710). For example, the UE (e.g., using receive processor 258, transmit processor 264, controller/processor 280, memory 282, and/or the like) may perform a measurement of a reference signal received in a first frequency range, as described above. In some aspects, the measurement may be performed by reception component 802 or measurement component 808.

As shown in FIG. 7, in some aspects, process 700 may include performing a measurement of the reference signal (block 720). For example, the UE (e.g., using receive processor 258, transmit processor 264, controller/processor 280, memory 282, and/or the like) may perform a measurement of a reference signal received in a first frequency range, as described above. In some aspects, the measurement may be performed by reception component 802 or measurement component 808.

As further shown in FIG. 7, in some aspects, process 700 may include determining a predicted measurement in a second frequency range using a model and based at least in part on the measurement of the reference signal received in the first frequency range (block 730). For example, the UE (e.g., using receive processor 258, transmit processor 264, controller/processor 280, memory 282, and/or the like) may determine a predicted measurement in a second frequency range using a model and based at least in part on the measurement of the reference signal received in the first frequency range, as described above. In some aspects, the determination of the predicted measurement may be performed by the determination component 810.

As further shown in FIG. 7, in some aspects, process 700 may include transmitting measurement information for the second frequency range based at least in part on the predicted measurement (block 740). For example, the UE (e.g., using receive processor 258, transmit processor 264, controller/processor 280, memory 282, and/or the like) may transmit measurement information for the second frequency range based at least in part on the predicted measurement, as described above. In some aspects, the transmission component 804 may transmit the measurement information.

Process 700 may include additional aspects, such as any single aspect or any combination of aspects described below and/or in connection with one or more other processes described elsewhere herein.

In a first aspect, the method includes transmitting a request for the reference signal in the first frequency range; and receiving the reference signal in the first frequency range based at least in part on the request. In some aspects, the transmission component 804 may transmit the request, and the reception component 802 may receive the reference signal based at least in part on the request.

In a second aspect, alone or in combination with the first aspect, the model is a machine learning model that is trained based at least in part on a training set of measurements in the first frequency range and measurements in the second frequency range. In some aspects, the training/updating component 812 may train the model.

In a third aspect, alone or in combination with one or more of the first and second aspects, the model receives, as input, information identifying at least one of: the measurement, angle of arrival information of a channel associated with the reference signal, angle of departure information associated with the channel, an estimated power delay profile associated with the channel, or position information for the UE.

In a fourth aspect, alone or in combination with one or more of the first through third aspects, the model outputs information indicating one or more beam directions associated with the predicted measurement.

In a fifth aspect, alone or in combination with one or more of the first through fourth aspects, process 700 includes updating the model using a machine learning algorithm based at least in part on comparing the predicted measurement to an observed measurement in the second frequency range. In some aspects, the training/updating component 812 may update the model.

In a sixth aspect, alone or in combination with one or more of the first through fifth aspects, process 700 includes transmitting at least part of the measurement information on the uplink control channel in the second frequency range. In some aspects, the transmission component 804 may transmit at least part of the measurement information.

In a seventh aspect, alone or in combination with one or more of the first through sixth aspects, the measurement information on the uplink control channel in the second frequency range includes a flag indicating that the predicted measurement is based at least in part on a prediction.

In an eighth aspect, alone or in combination with one or more of the first through seventh aspects, the measurement information on the uplink control channel in the second frequency range includes a flag indicating that the predicted measurement is determined using the model.

In a ninth aspect, alone or in combination with one or more of the first through eighth aspects, process 700 includes transmitting the measurement information on the uplink control channel in the first frequency range. In some aspects, the transmission component 804 may transmit the measurement information on the uplink control channel in the first frequency range.

In a tenth aspect, alone or in combination with one or more of the first through ninth aspects, the measurement information includes measurement information for the measurement on the reference signal received in the first frequency range and the predicted measurement in the second frequency range comprises a predicted channel measurement.

In an eleventh aspect, alone or in combination with one or more of the first through tenth aspects, the reference signal is a channel state information reference signal.

In a twelfth aspect, alone or in combination with one or more of the first through eleventh aspects, the measurement is performed in the first frequency range.

In a thirteenth aspect, alone or in combination with one or more of the first through twelfth aspects, the measurement information identifies the predicted measurement in the second frequency range.

Figure 8:
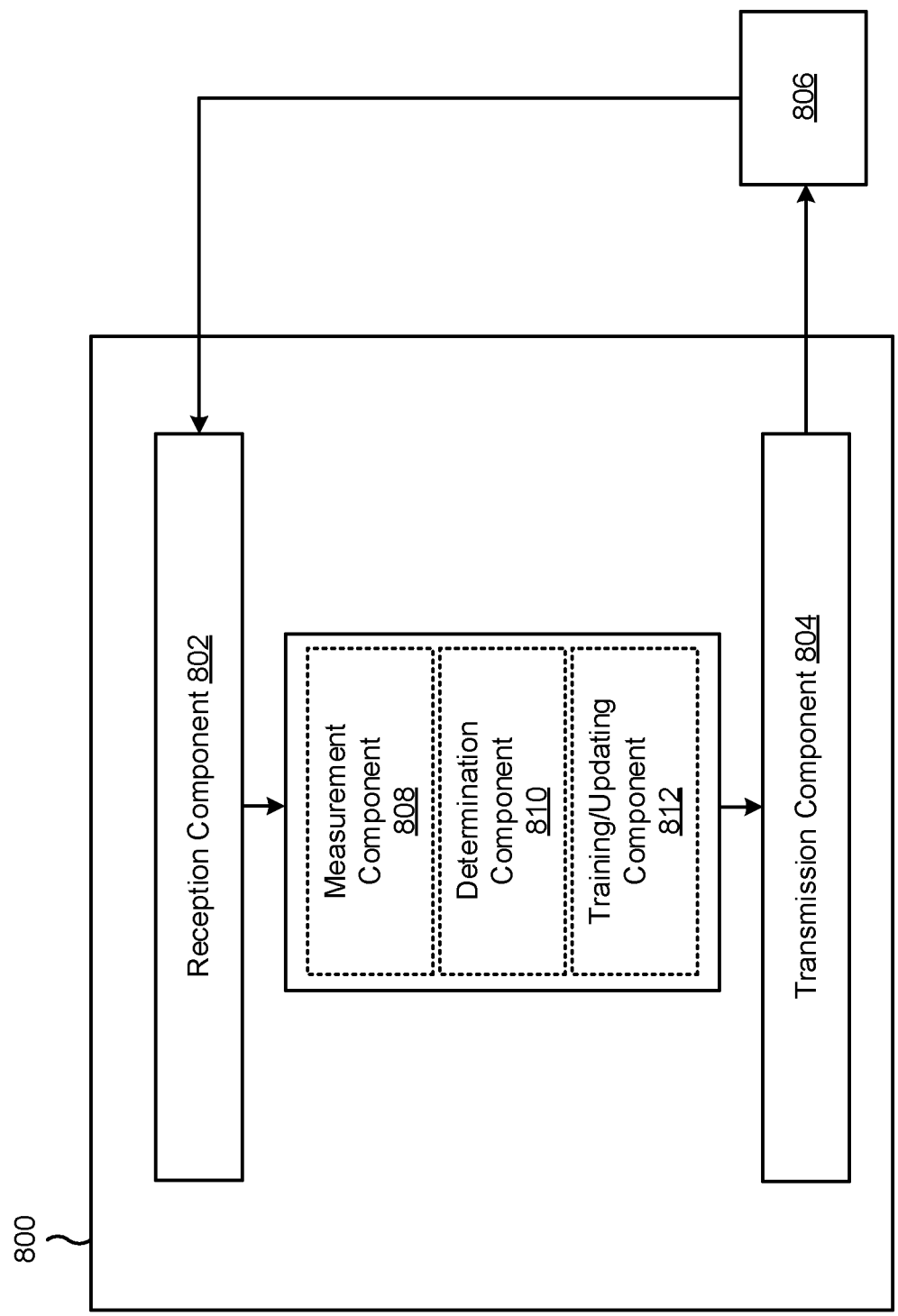
FIG. 8 is a block diagram of an example apparatus for wireless communication, in accordance with the present disclosure.

FIG. 8 is a block diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a measurement component 808, a determination component 810, or a training and/or updating (training/updating) component 812, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The reception component 802 may receive a reference signal in a first frequency range. In some aspects, the reception component 802 may receive a reference signal in a first frequency range based at least in part on a request transmitted by the transmission component 804. The measurement component 808 may perform a measurement of a reference signal received in the first frequency range. The determination component 810 may determine a predicted measurement in a second frequency range using a model and based at least in part on the measurement of the reference signal received in the first frequency range. The training/updating component 812 may train and/or update the model. For example, the training/updating component 812 may update the model using a machine learning algorithm based at least in part on comparing the predicted measurement to an observed measurement in the second frequency range. The transmission component 804 may transmit measurement information for the second frequency range based at least in part on the predicted measurement. In some aspects, the transmission component 804 may transmit a request for the reference signal in the first frequency range. In some aspects, the transmission component 804 may transmit the reporting information on an uplink control channel in the second frequency range. In some aspects, the transmission component 804 may transmit the reporting information on the uplink control channel in the first frequency range.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a block diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 3-8. Additionally, or alternatively, the apparatus 900 may be configured to perform one or more processes described herein, such as process 700 of FIG. 7 or operations of the base station 100 described with regard to FIG. 4. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

The transmission component 904 may transmit reference signals to an apparatus 906, such as a reference signal in a first frequency range. The reception component 902 may receive measurement information from the apparatus 906, such as measurement information indicating a predicted measurement for a second frequency range and/or a measurement for the first frequency range. In some aspects, a determination component 908 may determine whether measurement information indicated by the measurement information is associated with a predicted measurement or an observed measurement, for example, based at least in part on a flag associated with a measurement report received by the reception component 902.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a reference signal in a first frequency band of a first frequency range; performing a measurement of the reference signal; determining a predicted measurement in a second frequency band of a second frequency range using a model and based at least in part on the measurement of the reference signal received in the first frequency band of the first frequency range; and transmitting measurement information for the second frequency band based at least in part on the predicted measurement.

Aspect 2: The method of Aspect 1, further comprising: transmitting a request for the reference signal in the first frequency band; and receiving the reference signal in the first frequency band based at least in part on the request.

Aspect 3: The method of any of Aspects 1-2, wherein the model is a machine learning model that is trained based at least in part on a training set of measurements in the first frequency band and measurements in the second frequency band.

Aspect 4: The method of any of Aspects 1-3, wherein the model receives, as input, information identifying at least one of: the measurement, angle of arrival information of a channel associated with the reference signal, angle of departure information associated with the channel, an estimated power delay profile associated with the channel, information indicating the first frequency band, information indicating the second frequency band, or position information for the UE.

Aspect 5: The method of any of Aspects 1-4, wherein the model outputs information indicating one or more beam directions associated with the predicted measurement.

Aspect 6: The method of any of Aspects 1-5, further comprising: updating the model using a machine learning algorithm based at least in part on comparing the predicted measurement to an observed measurement in the second frequency band.

Aspect 7: The method of any of Aspects 1-6, wherein an uplink control channel on a primary cell or a primary secondary cell in the first frequency range and an uplink control channel on a secondary cell in the second frequency range are configured, and wherein the method further comprises: transmitting at least part of the measurement information on the uplink control channel in the second frequency range.

Aspect 8: The method of Aspect 7, wherein the measurement information on the uplink control channel in the second frequency range includes a flag indicating that the predicted measurement is based at least in part on a prediction.

Aspect 9: The method of Aspect 7, wherein the measurement information on the uplink control channel in the second frequency range includes a flag indicating that the predicted measurement is determined using the model.

Aspect 10: The method of any of Aspects 1-9, wherein an uplink control channel on a primary cell or a primary secondary cell in the first frequency range is configured, and wherein transmitting the measurement information further comprises: transmitting the measurement information on the uplink control channel in the first frequency range.

Aspect 11: The method of Aspect 10, wherein the measurement information includes measurement information for the measurement on the reference signal received in the first frequency band and wherein the predicted measurement in the second frequency band comprises a predicted channel measurement.

Aspect 12: The method of any of Aspects 1-11, wherein the reference signal is a channel state information reference signal.

Aspect 13: The method of any of Aspects 1-12, wherein the measurement is performed in the first frequency band.

Aspect 14: The method of any of Aspects 1-13, wherein the measurement information identifies the predicted measurement in the second frequency band.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a reference signal in a first frequency band of a first frequency range;
   and
   transmitting measurement information for a second frequency band of a second frequency range based at least in part on a predicted measurement in the second frequency band, the predicted measurement being associated with a model and based at least in part on a measurement of the reference signal received in the first frequency band of the first frequency range, the second frequency band being different from the first frequency band, wherein the model is a machine learning model based at least in part on measurements in the first frequency band and the second frequency band.

2. The method of claim 1, further comprising:
transmitting a request for the reference signal in the first frequency band; and
receiving the reference signal in the first frequency band based at least in part on the request.

3. The method of claim 1, wherein the model receives, as input, information identifying at least one of:
the measurement,
angle of arrival information of a channel associated with the reference signal,
angle of departure information associated with the channel,
an estimated power delay profile associated with the channel,
information indicating the first frequency band,
information indicating the second frequency band, or
position information for the UE.

4. The method of claim 1, wherein the model outputs information indicating one or more beam directions associated with the predicted measurement.

5. The method of claim 1, further comprising:
updating the model using a machine learning algorithm based at least in part on comparing the predicted measurement to an observed measurement in the second frequency band.

6. The method of claim 1, wherein an uplink control channel on a primary cell or a primary secondary cell in the first frequency range and an uplink control channel on a secondary cell in the second frequency range are configured, and wherein the method further comprises:
transmitting at least part of the measurement information on the uplink control channel in the second frequency range.

7. The method of claim 6, wherein the measurement information on the uplink control channel in the second frequency range includes a flag indicating that the predicted measurement is based at least in part on a prediction.

8. The method of claim 6, wherein the measurement information on the uplink control channel in the second frequency range includes a flag indicating that the predicted measurement is determined using the model.

9. The method of claim 1, wherein an uplink control channel on a primary cell or a primary secondary cell in the first frequency range is configured, and wherein transmitting the measurement information further comprises:
transmitting the measurement information on the uplink control channel in the first frequency range.

10. The method of claim 9, wherein the measurement information includes measurement information for the measurement on the reference signal received in the first frequency band and wherein the predicted measurement in the second frequency band comprises a predicted channel measurement.

11. The method of claim 1, wherein the reference signal is a channel state information reference signal.

12. The method of claim 1, wherein the measurement is performed in the first frequency band.

13. The method of claim 1, wherein the measurement information identifies the predicted measurement in the second frequency band.

14. A user equipment (UE) for wireless communication, comprising:
a memory; and
one or more processors coupled to the memory, the one or more processors configured to:
receive a reference signal in a first frequency band of a first frequency range; and
transmit measurement information for a second frequency band of a second frequency range based at least in part on a predicted measurement in the second frequency band, the predicted measurement being associated with a model and based at least in part on a measurement of the reference signal received in the first frequency band of the first frequency range, the second frequency band being different from the first frequency band, wherein the model is a machine learning model based at least in part on measurements in the first frequency band and the second frequency band.

15. The UE of claim 14, wherein the one or more processors are further configured to:
transmit a request for the reference signal in the first frequency band; and
receive the reference signal in the first frequency band based at least in part on the request.

16. The UE of claim 14, wherein the model receives, as input, information identifying at least one of:
the measurement,
angle of arrival information of a channel associated with the reference signal,
angle of departure information associated with the channel,
information indicating the first frequency band,
information indicating the second frequency band,
an estimated power delay profile associated with the channel, or
position information for the UE.

17. The UE of claim 14, wherein the model outputs information indicating one or more beam directions associated with the predicted measurement.

18. The UE of claim 14, wherein the one or more processors are further configured to:
update the model using a machine learning algorithm based at least in part on comparing the predicted measurement to an observed measurement in the second frequency band.

19. The UE of claim 14, wherein an uplink control channel on a primary cell or a primary secondary cell in the first frequency range and an uplink control channel on a secondary cell in the second frequency range are configured, and wherein the one or more processors are further configured to:
transmit at least part of the measurement information on the uplink control channel in the second frequency range.

20. The UE of claim 19, wherein the measurement information on the uplink control channel in the second frequency range includes a flag indicating that the predicted measurement is based at least in part on a prediction.

21. The UE of claim 19, wherein the measurement information on the uplink control channel in the second frequency range includes a flag indicating that the predicted measurement is determined using the model.

22. The UE of claim 14, wherein an uplink control channel on a primary cell or a primary secondary cell in the first frequency range is configured, and wherein the one or more processors, when transmitting the measurement information, are further configured to:

transmit the measurement information on the uplink control channel in the first frequency range.

23. The UE of claim 22, wherein the measurement information includes measurement information for the measurement on the reference signal received in the first frequency band and wherein the predicted measurement in the second frequency band comprises a predicted channel measurement.

24. The UE of claim 14, wherein the reference signal is a channel state information reference signal.

25. The UE of claim 14, wherein the measurement is performed in the first frequency band.

26. The UE of claim 14, wherein the measurement information identifies the predicted measurement in the second frequency band.

27. A non-transitory computer-readable medium storing one or more instructions for wireless communication, the one or more instructions comprising:

one or more instructions that, when executed by one or more processors of a user equipment (UE), cause the one or more processors to:

receive a reference signal in a first frequency band of a first frequency range;
and
transmit measurement information for a second frequency band of a second frequency range based at least in part on a predicted measurement in the second frequency band, the predicted measurement being associated with a model and based at least in part on a measurement of the reference signal received in the first frequency band of the first frequency range, the second frequency band being different from the first frequency band, wherein the model is a machine learning model based at least in part on measurements in the first frequency band and the second frequency band.

28. An apparatus for wireless communication, comprising:

means for receiving a reference signal in a first frequency band of a first frequency range;
and
means for transmitting measurement information for a second frequency band of a second frequency range based at least in part on a predicted measurement in the second frequency band, the predicted measurement being associated with a model and based at least in part on a measurement of the reference signal received in the first frequency band of the first frequency range, the second frequency band being different from the first frequency band, wherein the model is a machine learning model based at least in part on measurements in the first frequency band and the second frequency band.

* * * * *